Jan. 16, 1945.  G. S. HENDRIE  2,367,643

PLASTIC CONDUIT

Filed March 12, 1943

INVENTOR
George S. Hendrie.
BY
Gray and Smith
ATTORNEYS.

Patented Jan. 16, 1945

2,367,643

UNITED STATES PATENT OFFICE 2,367,643

PLASTIC CONDUIT

George S. Hendrie, Grosse Pointe Farms, Mich., assignor to Detroit Macoid Corporation, Detroit, Mich., a corporation of Michigan Application March 12, 1943, Serial No. 478,904

5 Claims. (Cl. 138—76)

The present invention relates to a flexible plastic conduit, among the principal objects being:

First, to provide a chemically inert flexible plastic conduit which is not subject to deterioration in use by oxidation, corrosion, or the like.

Second, to provide a flexible plastic conduit which has a high degree of resistance to crushing yet which is light in weight, and economical to manufacture by mass production methods.

Third, to provide a non-kinking and non-twisting flexible plastic conduit which, if desired, may be formed of di-electric thermo-plastic materials. The conduit being liquid-tight, air-tight and gas-tight.

Fourth, to provide a composite plastic conduit which may be used as a substitute for flexible metal conduits in many fields, such for example as flexible pipe couplings, air-hose connections, gasoline hose connection, and the like or similar uses.

Other objects of this invention will appear in the following description and appended claims, reference being had to the accompanying drawing forming a part of this specification wherein like reference characters designate corresponding parts in the several views.

Figure 1:
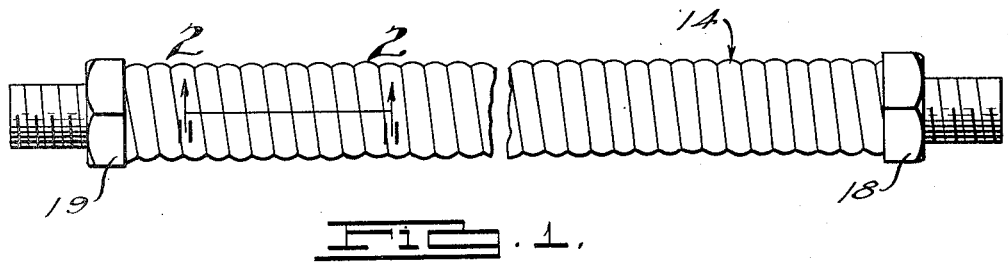
Fig. 1 is a fragmentary elevation of a plastic conduit embodying the present invention.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Heretofore flexible conduits formed of layers of spirally wound metals have been used extensively both as conduits and as protective sheaths for a wire or wires extending therethrough. In certain fields where a flexible metal conduit is desired, such devices have been used for the transmission of various kinds of fluids from one point to another. One important field of such use is in fuel feeding systems used in vehicles powered by internal combustion engines and in which the conduit is required to be sufficiently flexible to connect a portion of the vibrating engine to a rigid feed pipe usually secured to a frame member of the vehicle.

Another use of such flexible metal conduits is as a protective sheath for wire controls such as the so-called push-pull or Bowden wire controls. Another use of such conduits has been in the electrical wiring field where such conduits provide an armored cable through which extends an electric conduit.

Other uses for such metallic flexible conduits include flexible speaking tubes used in dictating machines and the like.

In my co-pending application, Serial No. 455,579, I have disclosed a type of plastic conduit which is adapted for substitution for flexible metal conduits in certain fields. Such a conduit is very suitable for use in those fields where a high resistance to crushing forces is not an important factor. In the present construction a flexible conduit is provided which has a much higher resistance to crushing forces and is therefore capable of carrying heavier loads than is the conduit disclosed in my said co-pending application.

In attempts heretofore made to replace metallic flexible conduits with plastic flexible conduits in instances where high resistance to crushing forces is required, the attempt has been made to impart sufficient structural strength to the plastic conduits by increasing the thicknesses of the wall sections. The provision of such thick sections is not desirable as it increases the cost of the conduit and makes it difficult to handle and manufacture economically in commercial quantities. Attempts heretofore made to reduce the wall thicknesses of such conduits resulted in so weakening the walls of the conduit that they no longer possessed the strength required to resist the crushing forces.

According to the present invention the plastic conduit consists of an inner spirally wound member 10, which is formed of an extruded plastic strip which is generally triangular in cross-section. This strip is wound spirally on a mandrel so that the apex of the triangular cross-section extends outwardly of the tube. The corners of the triangular section indicated by the numeral 12 are flattened as shown so that as the strip is tightly coiled the edges will lie firmly against each other and provide a continuous inner surface which is relatively smooth. This is an important feature particularly if the conduit is to be used, as for example in a push-pull control or in other uses where a wire or similar member is inserted through the center of the conduit.

Where various types of wire members are inserted through the central opening of the conduit, they very frequently have extended or bent end portions which will catch in any crevices or openings in the inner member. This is particularly undesirable in a conduit of the present type where a ready insertion and removal of the wire frequently is desired. In addition, an end of the inner wire projecting through the central member could cause considerable damage to the conduit and no longer render it fluid-tight.

Figure 2:
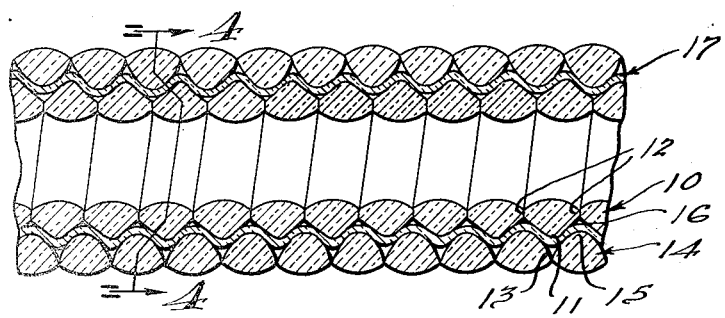
Fig. 2 is a sectional view taken substantially on the line 2—2 looking in the direction of the arrows of Fig. 1.

As shown particularly in Fig. 2, the apex portion 11 of the generally triangular strip nests in a valley portion 13 which is provided in the outer spirally wound plastic member 14.

The outer spirally wound member 14 consists of a spirally wound member generally similar in cross-section to the inner spirally wound member. The outer member 14 is wound on a mandrel in such a manner that the apex portions 15 extend inwardly of the conduit and are located for nesting in the valley portions 16, which lie between the outwardly extending apex portions 11 of the inner member 10.

Figure 3:
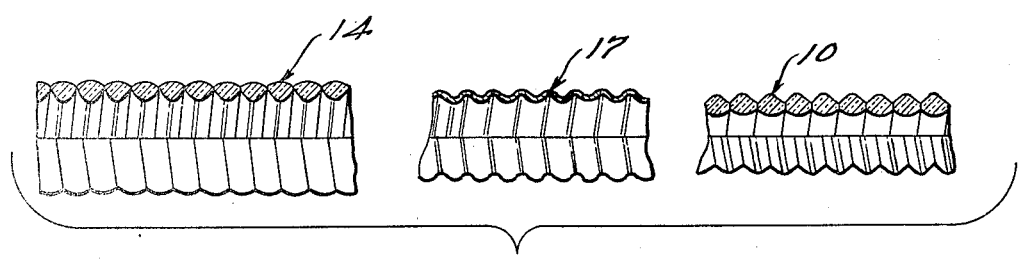
Fig. 3 is an exploded view showing the unassembled parts of the conduit partially in section and partially in elevation.
Figure 4:
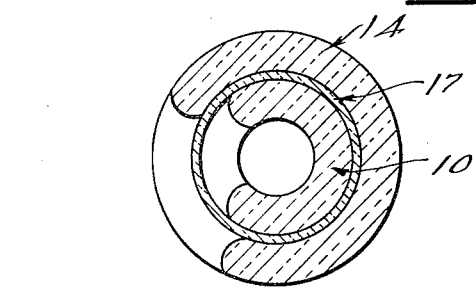
Fig. 4 is a sectional view taken substantially on the line 4—4 in the direction of the arrows of Fig. 2.

In instances where a fluid-tight conduit is not required, a conduit embodying the present invention could be provided which would consist merely of the inner spirally wound member 10 and the outer spirally wound member 14, formed as herein disclosed. It is preferable in most instances, however, to provide a conduit which is fluid-tight. Accordingly in the preferred embodiment of the invention here shown, a sealing member 17, which consists of a fluid-tight extruded plastic tube, is interposed between the inner spirally wound member 10 and the outer spirally wound member 14. The tube 17 as formed is a smooth-sided extruded tube of relative thin cross-section and of a plastic substance which preferably is deformable under pressure. After having been assembled in a conduit of the present invention, it will become corrugated as shown in Fig. 3, the corrugations corresponding generally to the apex and nesting valley portions of the inner and outer spirally wound members 10 and 14.

When used as a fluid-tight coupling, the flexible conduit of the present invention is preferably provided with suitable hose connections, such for example as the couplings 18 and 19 as shown in Fig. 1. Due to the radially rigid yet longitudinally flexible construction of the conduit made according to the present invention, the couplings 18 and 19 may be readily secured to the outer spirally wound member 14 in any suitable manner.

The spirally coiled inner member 10 and the spirally coiled outer member 14 may be formed in general of any suitable type of thermo-plastic materials. Preferably the materials employed are resinous thermo-plastic materials such as the polystyrene resins or the butyrates. However, other types of materials of this general nature may be employed. The tubular member 16 is preferably formed of a thermo-plastic resin such for example as a vinyl resin.

It is to be understood, however, that the construction of the conduit herein disclosed is not dependent upon any particular type of thermo-plastic material so long as the material possesses the abrasion resistant properties and the strength characteristics at the temperatures at which it is to be used, and is sufficiently flexible to permit the coiling of the inner member, preferably at a temperature below the temperature at which the conduit is intended to be used.

In the assembly of the conduit, the inner member 10 and the outer member 14 are preferably formed from continuous strips of extruded thermo-plastic materials which may, if desired, be formed according to the disclosures of my copending application Serial No. 362,638, or according to the disclosures of my issued Patent No. 2,294,555. In either event the strip which is formed is extruded as a continuous strip of any desired cross-section or configuration which is found to be substantially uniform throughout the length of the strip. To form the inner member 10, such a strip having the desired dimension and configuration is wound spirally on a mandrel which preferably has an outer circumference substantially the same as the inner circumference of the opening inside the assembled conduit. In this instance the strip is spirally wound thereon with the apex portions of the strip extending outwardly to form the inner member 10. The outer spirally wound member 14 is formed from an extruded strip which is wound on a mandrel which has a diameter substantially the same as the outside diameter taken between the apex portions 11 of the inner member 10. The strips may be wound on the respective mandrels either manually or in any desired type of mechanical winding device. By holding the ends of the strips and winding the member at approximately room temperature the members form tight spirally extending coils. In fabricating the conduit of the present invention, it is desirable to wind the inner member 10 on the mandrel and retain it on the mandrel while the plastic tube 17 is slipped over the inner spirally wound member 10. The outer spirally wound member 14 is removed from the mandrel and is then placed over the inner spirally wound member 10 and the plastic tubular member 17. Upon release of the mandrel from inside the inner spirally wound member 10, the tendency of the member is to uncoil, which causes it to expand and exert a pressure on the tube 17 and the outer member 14 and hold the respective parts of the conduit in their assembled positions. The grooves or valleys provided between the apex portions 15 of the outer spirally wound member 14 are so located with reference to the apex portions 11 of the inner spirally wound member 10 that the inner spirally wound member 10 is held in nested relation to the outer spirally wound member 14 with the interposed plastic tubular member 17 held tightly there between.

The extruded tubular member 17 preferably is formed by a continuous extrusion from any desired type of apparatus for continuously extruding such a plastic tube.

The use of the spirally wound inner coiled member 10 and the spirally wound outer member 14 both of which have a high resistance to radial deformation prevents twisting or kinking of the conduit while the spiral winding and longitudinal flexibility of the strips make the conduit flexible within the desired predetermined limits. The strength of such members is such that they will resist relatively high radially imposed loads without crushing. The fluid-tight member 17 interposed between the outer spirally coiled member 14 and the inner spirally coiled member 10 provides a fluid-tight liner or membrane between the two structural portions of the conduit and permits the use of the conduit for transmission of fluids of various kinds. The member 17 also seals the conduit and protects a wire or cable therein from deterioration due to oxidation or corrosion from substances seeping through the conduit.

If it is desired to form a dielectric conduit, this may be done by forming the members of the dielectric thermo-plastic materials, which, while acting as a protective covering for the wire, will also act as an electrical insulator therefor. Thus a conduit of the present invention may be used with a bare copper or other electrically conductive wire to provide a protective, non-twisting and non-kinking covering while at the same time providing an electrical installation for the electrically conductive wire.

When used as a chemically inert, fluid-tight, non-twisting and non-kinking connector conduit, the conduit may be provided with any desired type of hose fittings or other couplings. In many fields the plastic conduit of the present invention is preferred in use to metallic flexible conduits. This is particularly true in those instances where the conduit is used in contact with substances which would cause corrosion of metal conduits. One such use to which the plastic conduit of the present invention is particularly adapted is as a hose for inflating inflatable life rafts which frequently are used in prolonged contact with seawater, which, as is known, is very corrosive to metallic articles. Prolonged use of conduits of the present invention in seawater has not affected the materials and no deterioration in the structure of the conduit is apparent and such conduits have continued to function for long periods under very adverse operating conditions.

A flexible conduit embodying the present invention also may be used to advantage as a breathing tube in the construction of gas masks, oxygen masks, respirators or similar articles in which the breathing tube leading from a cannister or tank to the nose-piece must be flexible within large limits and the conduit must be relatively light in weight yet gas-tight, and chemically inert. The plastic flexible conduit of the present invention has been found to possess these properties.

I claim:

1. A fluid-tight flexible plastic conduit comprising a spirally wound inner member formed of an extruded plastic strip substantially triangular in cross-section with the apex portion of said strip extending outwardly of said conduit, and an outer member comprising a spirally wound thermo-plastic strip substantially triangular in cross-section with the apex portion thereof extending inwardly toward said inner member, each of said strips having abutting edge portions opposite said apex portions to provide substantially continuous internal and external walls, and a fluid-tight flexible sheath surrounding said inner member and engaged by said inner and outer members to provide a fluid-tight yet flexible conduit.

2. A fluid-tight flexible plastic conduit comprising a spirally wound inner member consisting of an extruded thermoplastic strip substantially triangular in cross-section with the base portion of each coil of said triangular section lying inside the said conduit and abutting the base portion of an adjacent coil to provide a substantially continuous surface therein, and the apex portion extending outwardly thereof and providing a substantially corrugated outer surface thereon, a fluid-tight sheath of a flexible thermoplastic tubing surrounding said inner member and a spirally wound plastic strip surrounding said tubing and engaging said tubing in intimate contact with the outer surface of said inner member.

3. A fluid-tight flexible plastic conduit comprising a spirally wound inner member consisting of an extruded thermo-plastic strip substantially triangular in cross-section with the base portion of each coil of said triangular section lying inside the said conduit and abutting against a like portion of an adjacent coil to provide a substantially continuous surface therein, the apex portion thereof extending outwardly thereof and providing a substantially corrugated outer surface thereon, a fluid-tight sheath of a flexible thermoplastic material surrounding said inner member, a spirally wound plastic strip surrounding said extruded tubing and holding said tubing in intimate contact with the outer surface of said inner member, said outer strip comprising a spirally wound extruded thermo-plastic strip substantially triangular in cross-section, the base portions of adjacent coils abutting each other to form a substantially continuous outer surface on the conduit, and the apex portion thereof extending inwardly of the conduit and meshing in the corrugated surfaces formed by the apex portions of the said spirally wound inner member.

4. A flexible plastic conduit adapted to resist relatively high radially imposed crushing loads and to flex longitudinally within predetermined limits without kinking or breaking and comprising a spirally wound outer member having tightly abutting coils formed of a plastic strip substantially triangular in cross-section, having its apex extending toward the inside of the conduit, a flexible fluid-tight tubular liner interposed inside of said outer member, and a resilient coiled inner member within said liner and adapted to exert a force on said liner to hold said liner in surface engagement with the apex portions of said outer member.

5. A flexible plastic conduit adapted to resist relatively high radially imposed crushing loads and to flex longitudinally within predetermined limits without kinking or breaking, and comprising an outer covering consisting of a spirally wound extruded plastic strip substantially triangular in cross-section and having its apex extending toward the inside of the conduit to provide a corrugated inside surface thereon, a flexible fluid-tight tubular liner maintained in contact against said outer member, and an inner member inside said tubular liner and comprising an extruded thermo-plastic strip substantially triangular in cross-section with its apex extending outwardly to provide a corrugated outside surface thereon whereby said liner is engaged between the corrugated surfaces of said inner member and said outer covering and said inner member each comprising abutting coils wound in tight spirals to provide a substantially continuous outer surface and inner wall for said conduit.

GEORGE S. HENDRIE.